US011741247B2

(12) United States Patent
Ciocarlie et al.

(10) Patent No.: US 11,741,247 B2
(45) Date of Patent: Aug. 29, 2023

(54) SMART PRIVACY AND CONTROLLED EXPOSURE ON BLOCKCHAINS

(71) Applicant: SRI International, Menlo Park, CA (US)

(72) Inventors: Gabriela Ciocarlie, New York, NY (US); Karim Eldefrawy, Palo Alto, CA (US); Tancrede Lepoint, Jersey City, NJ (US)

(73) Assignee: SRI International, Menlo Park, CA (US)

( * ) Notice: Subject to any disclaimer, the term of this patent is extended or adjusted under 35 U.S.C. 154(b) by 332 days.

(21) Appl. No.: 16/227,599

(22) Filed: Dec. 20, 2018

(65) Prior Publication Data

US 2020/0202018 A1    Jun. 25, 2020

(51) Int. Cl.
| | |
|---|---|
| *G06F 21/62* | (2013.01) |
| *G06F 21/64* | (2013.01) |
| *H04L 9/00* | (2022.01) |
| *G06F 21/78* | (2013.01) |
| *G06Q 40/08* | (2012.01) |
| *H04L 9/08* | (2006.01) |

(52) U.S. Cl.
CPC ............ *G06F 21/62* (2013.01); *G06F 21/645* (2013.01); *G06F 21/78* (2013.01); *G06Q 40/08* (2013.01); *H04L 9/008* (2013.01); *H04L 9/085* (2013.01); *G06Q 2220/10* (2013.01); *H04L 9/50* (2022.05); *H04L 2209/46* (2013.01)

(58) Field of Classification Search
CPC ......... G06F 21/62; G06F 21/78; H04L 9/008; H04L 2209/38
See application file for complete search history.

(56) References Cited

U.S. PATENT DOCUMENTS

| | | | |
|---|---|---|---|
| 2017/0279783 A1* | 9/2017 | Milazzo | B29C 64/00 |
| 2017/0329980 A1* | 11/2017 | Hu | G06F 21/78 |
| 2018/0225660 A1* | 8/2018 | Chapman | G06Q 20/3827 |
| 2019/0036678 A1* | 1/2019 | Ahmed | H04L 9/302 |
| 2019/0058709 A1* | 2/2019 | Kempf | H04L 9/3226 |

* cited by examiner

*Primary Examiner* — Ellen Tran
(74) *Attorney, Agent, or Firm* — Moser Taboada (57) ABSTRACT

A method, apparatus and system for providing controlled access to data in a distributed computing environment include storing received data to be accessed via the distributed computing environment in at least one storage device, generating at least one integrity data structure identifying at least a storage location of at least a respective portion of the stored data, storing the generated at least one integrity data structure in a block of a blockchain, encrypting the at least one integrity data structure in the block of the blockchain, and selectively providing at least a portion of at least one decryption key for decrypting the encrypted at least one integrity data structure to enable access to the respective portion of the stored data for which the at least one integrity data structure is generated. Additionally, the stored data can be encrypted and a decryption key can be provided for decrypting the stored data.

22 Claims, 7 Drawing Sheets

SMART PRIVACY AND CONTROLLED EXPOSURE ON BLOCKCHAINS

GOVERNMENT RIGHTS

This invention was made with government support under contract no. HSHQDC-16-C-00034 awarded by the U.S. Department of Homeland Security. The Government has certain rights in this invention.

FIELD

Embodiments of the present principles generally relate to data sharing in distributed computing environments and more specifically to methods, apparatuses and systems for providing smart privacy and controlled exposure of shared data in distributed computing environments using blockchains.

BACKGROUND

A blockchain is distributed ledger where each entry is (cryptographically) linked to the previous entry. The use of a distributed Byzantine-fault-tolerant consensus ensures integrity, authenticity, and resilience of the blockchain and the data stored on it. The consensus protocol ensures that the data stored on the blockchain cannot be modified by a malicious party that compromised a small fraction of servers of a distributed computing environment. However, the amount of data that can be stored on a blockchain is limited.

There is a need to be able to externally store data yet take advantage of security protocols available for data stored on a blockchain.

SUMMARY

Embodiments of methods, apparatuses and systems for providing smart privacy and controlled exposure of shared data in distributed computing environments using blockchains are disclosed herein.

In some embodiments a method for providing controlled access to data in a distributed computing environment includes storing received data to be accessed via the distributed computing environment in at least one storage device, generating at least one integrity data structure identifying at least a storage location of at least a respective portion of the stored data, storing the generated at least one integrity data structure in a block of a blockchain, encrypting the at least one integrity data structure in the block of the blockchain, and selectively providing at least a portion of at least one decryption key for decrypting the encrypted at least one integrity data structure to enable access to the respective portion of the stored data for which the at least one integrity data structure is generated. In some embodiments, the method can further include encrypting the stored data and selectively providing at least a portion of at least one decryption key for decrypting the stored data.

In some embodiments, an apparatus for providing controlled access to data in a distributed computing environment includes a processor and a memory coupled to the processor. The memory of the processor includes stored therein at least one of programs or instructions executable by the processor to configure the apparatus to store received data to be accessed via the distributed computing environment in at least one storage device, generate at least one integrity data structure identifying at least a storage location of at least a respective portion of the stored data, store the generated at least one integrity data structure in a block of a blockchain, encrypt the at least one integrity data structure in the block of the blockchain, and selectively provide at least a portion of at least one decryption key for decrypting the encrypted at least one integrity data structure to enable access to the respective portion of the stored data for which the at least one integrity data structure is generated.

In some embodiments the apparatus can be further configured to encrypt the stored data and selectively provide at least a portion of at least one decryption key for decrypting the stored data. In some embodiments, the apparatus can be further configured to provide at least one integrity data structure in each of a plurality of blocks of the blockchain, wherein each of the at least one integrity data structures is representative of a different, respective portion of the stored data.

In some embodiments, a system for providing controlled access to data in a distributed computing environment includes a plurality of servers connected via a permissioned blockchain, a storage device, and an apparatus including a processor and a memory coupled to the processor. The memory of the processor includes stored therein at least one of programs or instructions executable by the processor to configure the apparatus to store received data to be accessed via the distributed computing environment in at least one storage device, generate at least one integrity data structure identifying at least a storage location of at least a respective portion of the stored data, store the generated at least one integrity data structure in a block of a blockchain, encrypt the at least one integrity data structure in the block of the blockchain, and selectively provide at least a portion of at least one decryption key for decrypting the encrypted at least one integrity data structure to enable access to the respective portion of the stored data for which the at least one integrity data structure is generated.

Other and further embodiments of the present principles are described below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the present principles and are therefore not to be considered limiting of scope, for the present principles may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

In the following description, numerous specific details are set forth in order to provide a thorough understanding of exemplary embodiments or other examples described herein. However, these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed. For example, although embodiments of the present principles are described with respect to a specific distributed data communications environment, embodiments of the present principles can be applied in other specific hardware and software, other hardware devices and software means capable of communicating data in a distributed manner or other data communication means using blockchains in accordance with various embodiments of the present principles.

Although an original intent of the blockchain technology was designed for cryptocurrency having complete transparency, blockchain applications in accordance with the present principles require privacy—and for business applications, there needs to be some accountability. For example, with respect to escrow privacy, although the data generally needs to remain private, a system, apparatus and process in accordance with the present principles is capable of revealing parts of the data to participating members as necessary.

Embodiments in accordance with the present principles provide methods, apparatuses and systems for providing smart privacy and controlled exposure of shared data in distributed communication environments using blockchains. In various embodiments in accordance with the present principles, data can be stored in a storage external to a blockchain and servers of a distributed computing environment and an integrity data structure can be provided in at least one block of the blockchain identifying at least a storage location and a structure of at least a respective portion of the data stored in the external storage. In some embodiments in accordance with the present principles, the stored data can be encrypted. In addition or alternatively, the integrity data structure in the at least one blockchain can be encrypted. In some embodiments, at least a portion of at least one decryption key for decrypting the encrypted at least one integrity data structure is selectively provided to enable access to the respective portion of the stored data for which the at least one integrity data structure was provided.

The terms data and information are used interchangeably herein. In accordance with embodiments of the present principles data and information can included information regarding transactions performed, analytics and statistics of respective servers/devices, records added and/or updated, added data, and/or any other information adding to or modifying existing data dependent upon for which application embodiments of the present principles are being applied.

Conventionally, a Blockchain is literally just a chain of blocks. In this context, the words "block" and "chain" identify digital information stored on a ledger/spreadsheet (the "block") stored in a public database (the "chain") of a server. The ledger/spreadsheet (blockchain) is duplicated at the servers across a network of computers. The network is designed to regularly update the ledger/spreadsheet. Data stored in the blocks of a blockchain exists as shared—and continually reconciled—databases.

All current blockchains have fields in the blocks that can be filled with user-defined values. It is a known fact that data can be stored in these fields in order to store the data on the blockchain. A completed block is given a unique, identifying code called a hash code, which identifies the data structure of the block. The block is also given the hash of the most recent block added to the blockchain to provide security and ensure that information stored in a previous block cannot be changed. If information of a previous block is changed, the hash of the previous block changes.

The inventors herein propose an improved blockchain structure. In accordance with embodiments of the present principles, the inventors propose storing data associated with blocks of a blockchain in a way that can allow for more security and privacy. In such embodiments, an integrity data structure identifying at least one of a data structure and location of data associated with a respective block of a blockchain stored in the external storage is provided in the block of the blockchain instead of the data itself.

Figure 1:
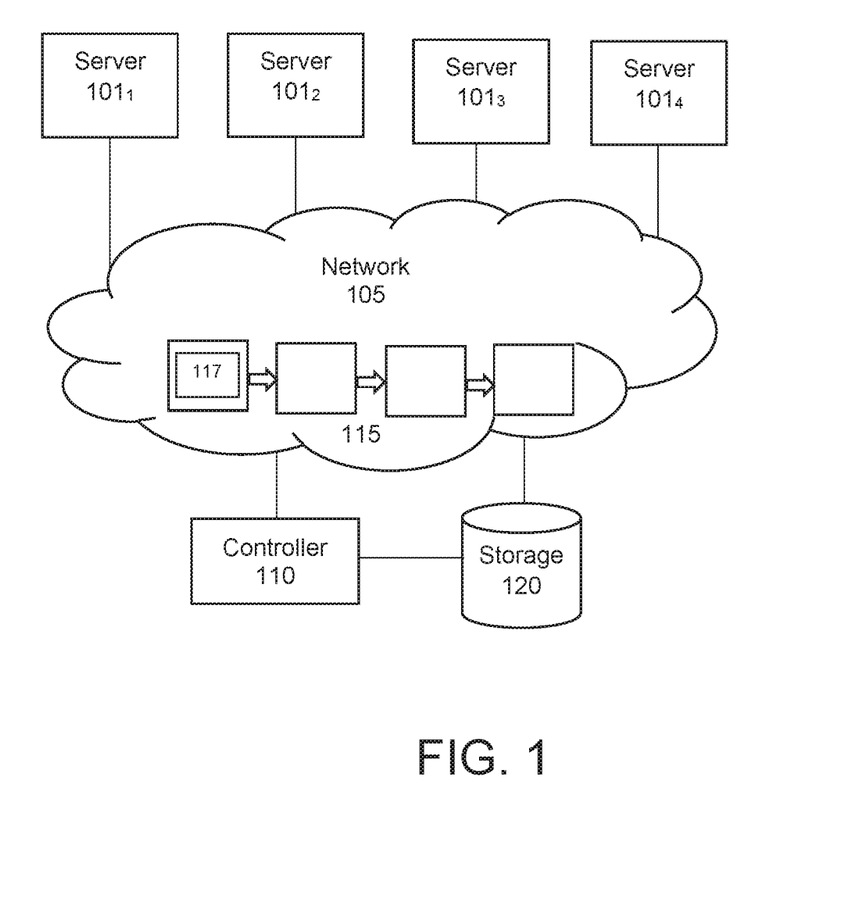
FIG. 1 depicts a high level block diagram of a distributed computing environment in which an embodiment of the present principles can be applied. The distributed computing environment 100 of FIG. 1 illustratively comprises

FIG. 1 depicts a high level block diagram of a distributed computing environment in which an embodiment of the present principles can be applied. The distributed computing environment 100 of FIG. 1 illustratively comprises a plurality of (illustratively four) servers $101_1$-$101_4$ (collectively servers 101), a network 105, a data controller 110 and a storage device 120. In some embodiments, the storage device 120 of FIG. 1 can comprise Read Only Memory (ROM), Random Access Memory (RAM), disk drive storage, optical storage, removable storage, cloud storage or any other type of storage suitable for storing data and information as described herein. In addition, although in the embodiment of FIG. 1 the storage device 120 is depicted as comprising a separate device, alternatively or in addition, the storage device 120 can comprise an integrated storage means of, for example, the data controller 110.

In the distributed computing environment 100 of FIG. 1, each of the servers $101_1$-$101_4$ is capable of generating data and sharing the data over the network 105, for example, via a blockchain 115 (described in greater detail below). In some embodiments in accordance with the present principles, the network 105 can comprise a local area network, a wide area network, a virtual private network, a wireless local network, a system area network, a passive optical network, an enterprise private network, an internet or any number of different computer systems connected by physical and/or wireless connections that enable computers and/or individuals to share information and resources. In the embodiment of FIG. 1, all of the servers 101 are illustratively in communication with the data controller 110 and the storage device 120 over the network 105. As depicted in FIG. 1, in the distributed computing environment 100, the data logging controller 110 can communicate with the storage device 120 over the network 105 and, or alternatively, can communicate with the storage device 120 directly. Although in the embodiment of the distributed computing environment 100 of FIG. 1 the components are depicted as communicating over the network 105, in alternate embodiments in accordance with the present principles, the components of the distributed computing environment 100 of FIG. 1 can be configured to communicate directly.

Figure 2:
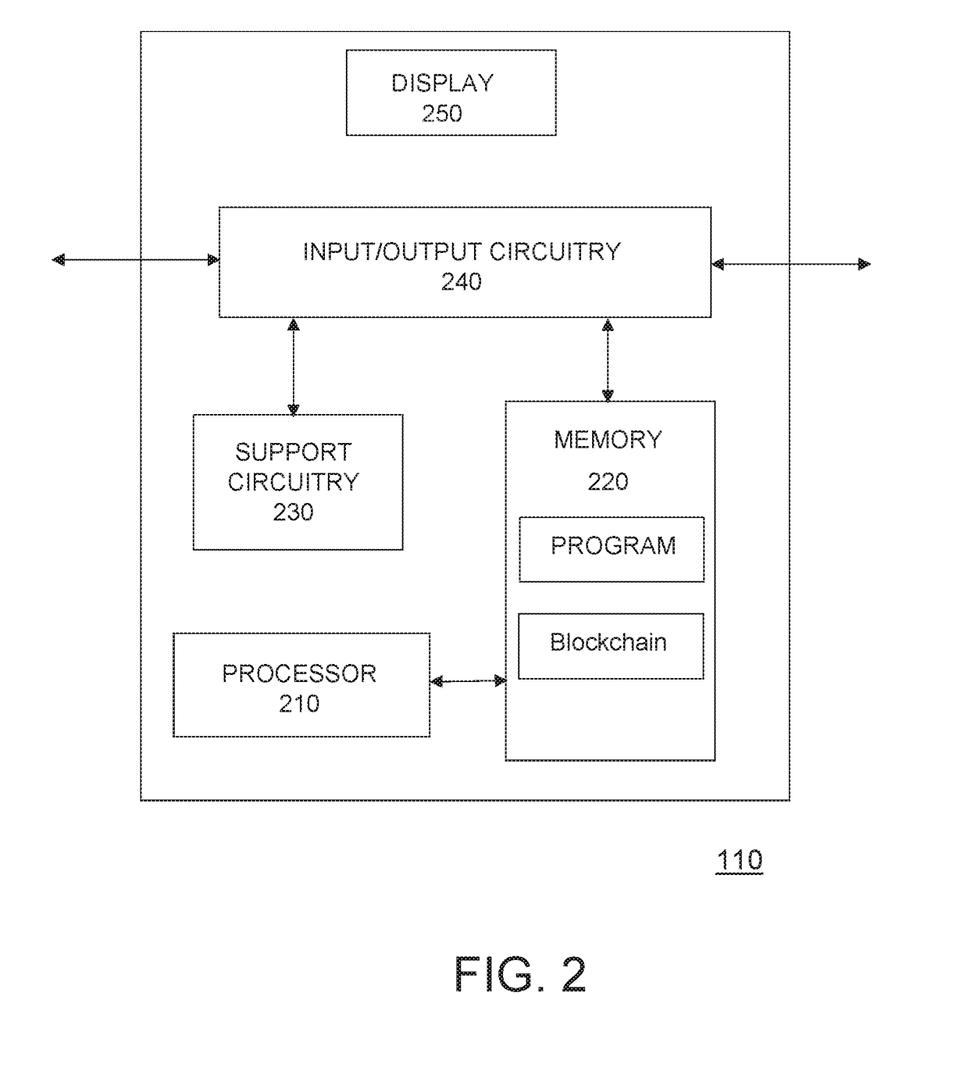
FIG. 2 depicts a high level block diagram of a data controller in accordance with an embodiment of the present principles.

FIG. 2 depicts a high level block diagram of a data controller capable 110 of performing the herein described functions and processes of the present principles in accordance with an embodiment of the present principles. The data controller 110 of FIG. 2 illustratively comprises a processor 210, which can include one or more central processing units (CPU), as well as a memory 220 for storing control programs, data, a copy of the blockchain 115 and the like. The processor 210 cooperates with support circuitry 230 such as power supplies, clock circuits, cache memory and the like as well as circuits that assist in executing the software routines/programs stored in the memory 220. As such, some of the process steps discussed herein as software processes may be implemented within hardware, for example, as circuitry that cooperates with the processor 210 to perform various steps. The data controller 110 also contains an input-output circuitry and interface 240 that forms an interface between the various functional elements communicating with the computing system data controller 110. For example, in some embodiments the input-output circuitry and interface 240 can include or be connected to an optional display 250, a keyboard and/or other user input (not shown). The input-output circuitry and interface 240 can be implemented as a user interface for interaction with the data controller 110.

The data controller 110 can communicate with other computing devices based on various computer communication protocols such as Wi-Fi, Bluetooth™ (and/or other standards for exchanging data over short distances includes protocols using short-wavelength radio transmissions), USB, Ethernet, cellular, an ultrasonic local area communication protocol, etc. The computing system 900 can further include a web browser.

Although the data controller 110 of FIG. 2 is depicted as a general purpose computer, the data controller 110 is programmed to perform various specialized control functions in accordance with the present principles and embodiments can be implemented in hardware, for example, as an application specified integrated circuit (ASIC). As such, the process steps described herein are intended to be broadly interpreted as being equivalently performed by software, hardware, or a combination thereof.

In the embodiment of the distributed computing environment 100 of FIG. 1, all of the entities are connected via a permissioned blockchain 115, which is a private common ledger agreed on by the entities according to some access policies. The permissioned blockchain technology implemented in the distributed computing environment 100 of FIG. 1 is, however, modified in accordance with embodiments of the present principle as described below.

In some embodiments in accordance with the present principles, the server 101 can generate data to be stored and/or collect analytics and statistics of a system (not shown) to which the server 101 is connected. In some other embodiments in accordance with the present principles, a node (not shown) associated with a system of the present principles can be provided for each server 101 to generate data to be stored and/or collect analytics and statistics of a system (not shown) to which the server 101 is connected. Such an embodiment is described in further detail below with respect to a cyber insurance use case described below.

In such an embodiment, the servers 101 can include the insured, an insurer and other third parties needing access to generated, information. In such an environment, the parties use stored data as a record keeping and logging system of the data.

In one embodiment of the distributed computing environment 100 of FIG. 1, upon generating data, a server 101 communicates the data to the data controller 110. Alternatively, or in addition, in other embodiments of the present principles, a server 101 upon generating data, stores the data in a block of the blockchain 115. When the block is completed, a copy of the block is added to the blockchain 115 and copies of the blockchain 115 maintained at the various participating components of the distributed computing environment 100 of FIG. 1, including the data controller 110, are updated with the new block.

Upon receiving the data, the data controller 110 verifies the data received form the server 101 or node (not shown), for example by verifying that the data has been created by a participating server, and, in the former embodiment described above in which a data controller 110 receives data directly from a server 101, stores the data in the storage device 120 and generates an integrity data structure 117 to be stored in a block of the blockchain 115 to identify the data stored in the storage device 120. In the embodiment in which data generated by a server is stored in a block of the blockchain 115, upon receiving the updated blockchain with the server data, the data controller 110 stores the data stored by the servers 110 in the block of the blockchain 115 in the storage device 120 and stores, in a new block of the blockchain 115, an integrity data structure 117 to take the place of the data previously stored in the block of the blockchain 115 by the servers 101 and now stored in the storage device 120.

That is, the data controller 110 generates, for the data that the data controller 110 stored in the storage device 120, an integrity data structure 117 that includes an identifier/link (e.g., address) of where in the storage device 120 the respective data is stored. In some embodiments in accordance with the present principles, the generated integrity data structure 117 also includes an integrity check of the data to be stored. In some embodiments, the integrity check can comprise a hash code, block cyphers, pure hash or keyed hash, public key signature or a combination of any of the integrity data structures which can uniquely identify a structure or composition of the stored data.

Figure 7:
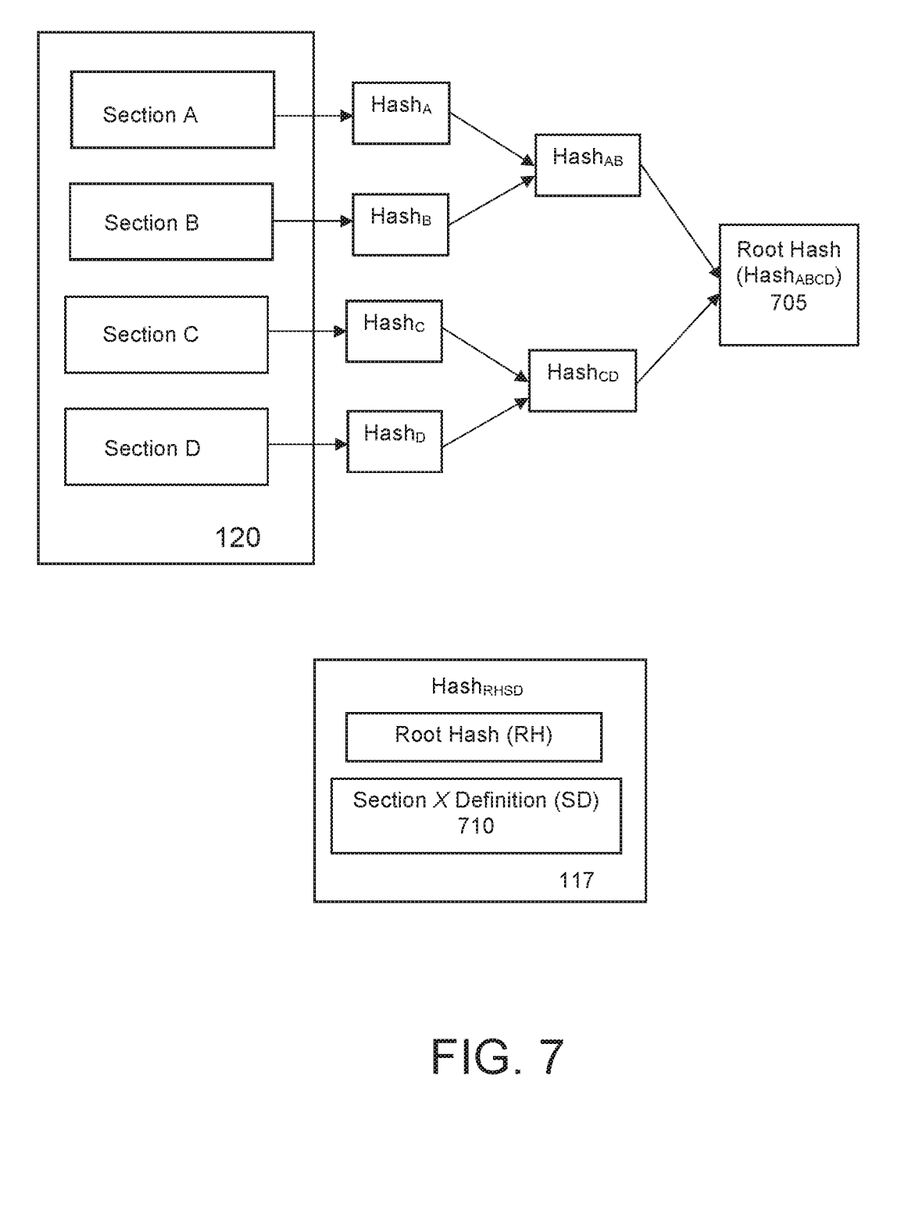
FIG. 7 depicts a high level block diagram of an integrity data structure 117 including an integrity check in accordance with an embodiment of the present principles.

For example, FIG. 7 depicts a high level block diagram of an integrity data structure 117 including an integrity check in accordance with an embodiment of the present principles. As depicted in FIG. 7, in accordance with the present principles, data received by the data controller 110 can be stored in the storage device 120 in sections, illustratively four sections (A, B, C, D). In some embodiments, the sections of the stored data in the storage device can represent individual pieces of data/transactions associated with a blockchain. In the embodiment of FIG. 7, data in each of the sections A-D is individually hashed. Data in a combination of sections, illustratively Sections A-B and Sections C-D, are hashed in combination. The combined Sections A-B and C-D can then be hashed as a whole. The Root Hash 705 is defined as the hash of all of the hashes that are stored in the storage device 120. In the embodiment of the present principles depicted in FIG. 7, the integrity data structure 117 including an integrity check in accordance with an embodiment of the present principles includes a hash of the Root Hash 705 and section definition 710 of a section of data (X) for which the integrity data structure 117 is being generated.

The corresponding root hash 805 and section definition 810 are hashed such that the integrity of the content of the data for which the integrity data structure 117 is being generated can be verified using the Root Hash 705 and an integrity of the section definition for the section for which the integrity data structure 117 is being generated can be verified using the section definition 710.

In accordance with various embodiments of the present principles, an integrity data structure 117 can be generated for data each time new data is received by the data controller 110 or, similar to conventional blockchain technology, an integrity data structure 117 can be generated after a predefined amount of data has been compiled. The determination of for how much data to generate an integrity data structure 117 in accordance with the present principles is dependent upon the granularity desired in a system.

In the computing environment 100 of FIG. 1, the data controller 110 stores a generated integrity data structure 117 in a block to be incorporated into the blockchain 115, which is accessible by all of the participating servers 101 of the distributed computing environment 100 of FIG. 1. In some embodiments in accordance with the present principles, copies of the blockchain 115 are distributed to each of the servers 101 of the distributed computing environment 100 of FIG. 1. In alternate embodiments, the blockchain 115 is made public such that the servers 101 are able to access the information in the blockchain 115. Because in some embodiments the integrity data structure 117 includes an integrity check of the data associated with the integrity data structure 117, data associated with the integrity data structure 117 cannot be modified without being detected after the integrity data structure 117 has been stored in the blockchain 115.

In accordance with embodiments of the present principles, a block of a blockchain is configured to store a predefined amount of information or number of generated integrity data structures before being considered complete and being added to the blockchain. In various embodiments, an amount of storage used in a block before a block is considered complete and is added to a blockchain is dependent upon a granularity desired in a system.

In some embodiments in accordance with the present principles, once a block is considered complete, the block is given a unique, identifying code (e.g., a hash code) before being added to the blockchain. In some embodiments, the block is also given the hash of the most recent block added to the blockchain.

Because in accordance with embodiments of the present principles, each of the servers 101 has access to information in the blockchain 115, each of the servers 101 of the distributed computing system 100 of FIG. 1 can access the generated integrity data structures 117 and as such, each of the servers 101 has access to information identifying the location of data stored in the storage 120 and respective integrity checks of such data, assuming that a server 101 has permission to do so. For example, in some embodiments in accordance with the present principles, access to the information stored on the blocks of the blockchain 115 and as such information stored in the storage device 120 can be controlled.

In some embodiments in accordance with the present principles, at least one of the data stored in the storage device 120 and the information stored in a block of the blockchain 115 (e.g., the generated integrity data structure(s) 117) can be encrypted using several encrypting techniques including key ratcheting, homomorphic encryption and other known encryption techniques, which will be described in greater detail below.

In such embodiments, to provide controlled to stored information and/or data, decryption keys associated with specific portions of encrypted information or data can be selectively provided to participating servers 101 which require access to the respective portions of the information or data.

In accordance with some embodiment of the present principles, at least one of data stored in the block of a blockchain 115n or data stored in the storage device 120 can be encrypted using a key ratcheting encryption technique. In such embodiments, msk represent a master secret key and $k_i$ represent a secret key associated to a time period $t_i = t_0 + i \cdot \Delta t$, where $t_0$ is the time the system is initialized and $\Delta t$ is a time period after which a new key is generated. Under ratcheting, the key update works as follows: for all $$k_i = \text{KDF}(k_{i-1}, K_i)$$

where KDF is a key derivation function, and $K_i$ is an auxiliary information that can be made public or kept secret. More specifically, before using the blockchain for the first time, the data controller 110 creates a master secret key msk, stores it securely, and defines $k_0 = \text{msk}$, where $t_0$ is the initial time. During the upload of data at time period $t_i = t_0 + i \cdot \Delta t$, the data controller 110 recursively computes $k_i = \text{KDF}(k_{i-1}, K_i)$ from the last stored $k_j$, where $K_i$ is to be specified. The data is then encrypted under $k_i$.

The auxiliary information, $K_i$, can be either kept public or made private, and in some embodiments can depend on the time period. In alternate embodiments, the auxiliary information, $K_i$, is not dependent on the time period. Examples of suggested $K_i$ are the following:

- $K_i = \text{msk}$: this allows to recombine the session key $k_{i-1}$ with the long-term master secret key in order to produce $k_i$;
- $K_i = f(N)$: where N is a secret nonce only known by the entity and f a function. This allows to recombine the session key $k_{i-1}$ with a function of a secret element in order to produce $k_i$;
- $K_i = f(1)$ or $K_i = \perp$: the auxiliary information can be a function or the current time or even null: this suggest that the session $k_i$ is constructed from $k_{i-1}$ and public data.

In such embodiments to enable access to at least a portion of the encrypted data, the data controller 110 can selectively reveal at least one of the keys, $k_i, \ldots k_j$, to a server 101 and only the corresponding data will be accessible by the server 101.

In accordance with some embodiment of the present principles, at least one of data stored in the block of a blockchain 115 or data stored in the storage device 120 can be encrypted using a homomorphic encryption technique. A homomorphic encryption technique is an encryption technique that further allows an entity in possession of an evaluation key to evaluate a class of function on the encrypted data without needing to decrypt the encrypted data. For example, using cipher-texts $c_1, \ldots, c_n$ corresponding to encryptions of messages, $m_1, \ldots, m_n$, a server 101 can compute an element $C = \text{Eval}(\text{evk}, f, c_1, \ldots c_n)$ that will decrypt to $f(m_1, \ldots, m_n)$ under the secret key, sk. More specifically, the data controller 110 can generate a tuple (pk, sk, evk) from the key generation procedure of a homomorphic encryption scheme, where pk denotes the public key, sk denotes the secret key, and evk denotes the evaluation key. The data controller 110 can then, using the public key pk or the secret key sk, encrypt the data.

In various embodiments in accordance with the present principles, a secret sharing (SS) protocol and a multi-party Protocol (MPC) can be implemented. In a secret sharing scheme a dealer shares a secret s among n parties such that an adversary corrupting up to t parties does not learn s, while any t+1 parties can efficiently recover s. Over a long period of time all parties may be corrupted thus violating the threshold t, which is accounted for in Proactive Secret Sharing (PSS).

PSS schemes periodically randomize (refresh) the shares of the secret and invalidate old ones. PSS retains confidentiality even when all parties are corrupted over the lifetime of the secret, but no more than t during a certain window of time, called the refresh period.

In one embodiment, a secret s is shared and reconstructed among n parties ($P_i$ where i={, . . . n}) with threshold t as follows:

1—Share Algorithm:
  a. Pick a random univariate polynomial, p(x), of degree t such that p(0)=s
  b. Evaluate p(x) at n points, e.g., at the indices of the parties p(1), p(2), . . . , p(n)
  c. The share of each party $P_i$ will be p(i)

2—Reconstruct Algorithms:
  a. To reconstruct the secret t+1 parties can use their shares to interpolate the polynomial p(x) (using Lagrange interpolations or any similar method), and determine the recovered secret to be the free term of the interpolated polynomial, i.e., s=p(0).

An MPC protocols allows a set of distrusting parties (which is typically implemented in software and run on physical or virtual servers) to securely compute a joint function of their private inputs without revealing anything but the output of the function to each other. In algebraic MPC, the computation (sometimes called function) to be performed is represented as a layered (arithmetic) circuit, for examples, a tree of addition and multiplication gates, and layer of input gates and a layer of output gates. An MPC protocol can consist of the following sub-protocols:

Share: is the share algorithm of an underlying linear scheme, such as the SS scheme described above. The Share algorithm enables a party/dealer to share a secret s among n parties such that any fraction of t or less parties cannot learn anything about s while any t+1 can reconstruct it via the Reconstruct algorithm below. This protocol is used to implement the input gates, for example, each party shares its input among the other n parties.

Add: is a distributed protocol that enables the parties to compute a sharing of the addition of two shared secrets $s_1$ and $s_2$. Add typically only involves local computation where each party adds its share of $s_1$ to that of $s_2$.

Multiply: is a distributed protocol that enables the parties to compute a sharing of the multiplication of two shared secrets $s_1$ and $s_2$. Multiply typically involves interaction between the parties.

Reconstruct: is the reconstruct algorithm of an underlying linear scheme, such as the SS scheme described above. Reconstruct enables t+1 or more parties to reconstruct the shared secret s. The reconstruct algorithm typically is used to construct the output of the computation, i.e., the output gates.

An MPC circuit is thus computed from the input layer down to the output layer using the above protocols to compute the corresponding gates.

In one implementation of MPC, MPC can be used in multiple points in privacy-preserving blockchain data, such as smart contracts. For example, MPC can be used to securely store decryption keys in a secret shared format, then when a decryption operation is performed it is not computed directly using the key in the clear, but instead it is computed using the shared key in a distributed manner without requiring the key be reconstructed in memory. In such an embodiment, Party 1 can generate a tuple (pk, sk, evk) from the key generation procedure of a homomorphic encryption scheme, where pk denotes the public key, sk denotes the secret key, and evk denotes the evaluation key. sk is then split into multiple shares (e.g., 3 shares sk1, sk2, sk3) using an appropriate secret sharing scheme such as described above, and each share is stored on a (physical and/or logically) separate server such as the servers 101 of FIG. 1. Because no single server has sk, the decryption cannot be done in the clear. The decryption algorithm has to be represented as a series of addition and multiplication steps which are evaluated in a distributed manner between the different servers 101 holding the shares of the secret key sk.

MPC can also be used to realize a scenario where some data is meant to be private, but still unmodifiable, and only when two parties come together and use a blockchain can they generate a smart contract or any computation. In such an embodiment, the originating (first) party uses a secret sharing scheme to split the data it needs into multiple shares, (e.g., 3 shares). The second party is considered the receiving (second) party. One share of the data is kept with the first party, another is given to the second party, and the third in uploaded to a blockchain. For secure computation and evaluation of data, such as a smart contract, the two parties together with the blockchain can create any required smart contract by preforming MPC on their shares of the data. The result of the smart contract is available in the clear, or it can be combined with an encryption scheme to result in an encrypted result of the smart contract evaluation.

Figure 3:
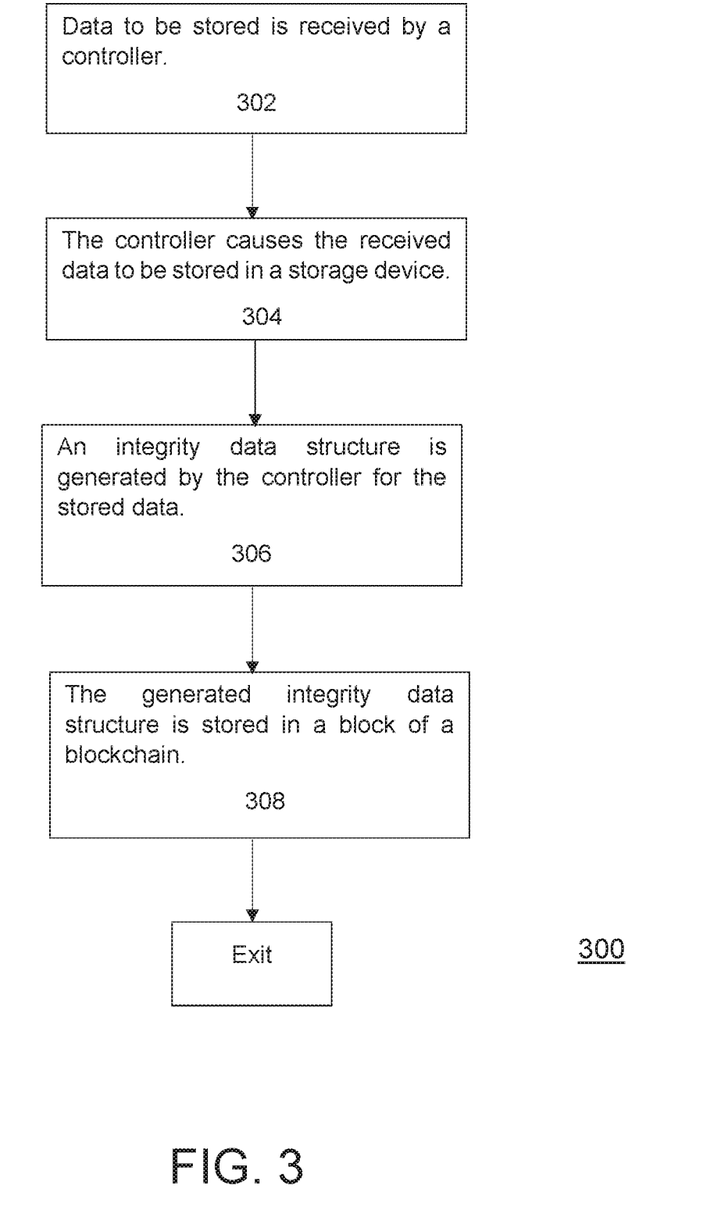
FIG. 3 depicts a flow diagram of a method 300 for increasing a capacity of data/information that can be associatively stored in a block of a blockchain in accordance with an embodiment of the present principles.

FIG. 3 depicts a flow diagram of a method 300 for increasing a capacity of data/information that can be associatively stored in a block of a blockchain in accordance with an embodiment of the present principles. The method 300 begins at 302 during which data to be stored is received by a controller in accordance with the present principles. The method 300 can proceed to 304.

At 304, the controller causes the received data to be stored in a storage device. The method 300 can proceed to 306.

At 306, an integrity data structure is generated by the controller for the stored data. As described above, in some embodiments in accordance with the present principles, the integrity data structure includes at least a link identifying a location of where in the storage device the data is stored. Additionally and as further described above, in some embodiments, the integrity data structure can further include a respective integrity check of the stored data. The method 300 can proceed to 308.

At 308, the generated integrity data structure is stored in a block of a blockchain. As described above, once the block is considered complete, the block is added to the blockchain. The method 300 can then be exited.

Figure 4:
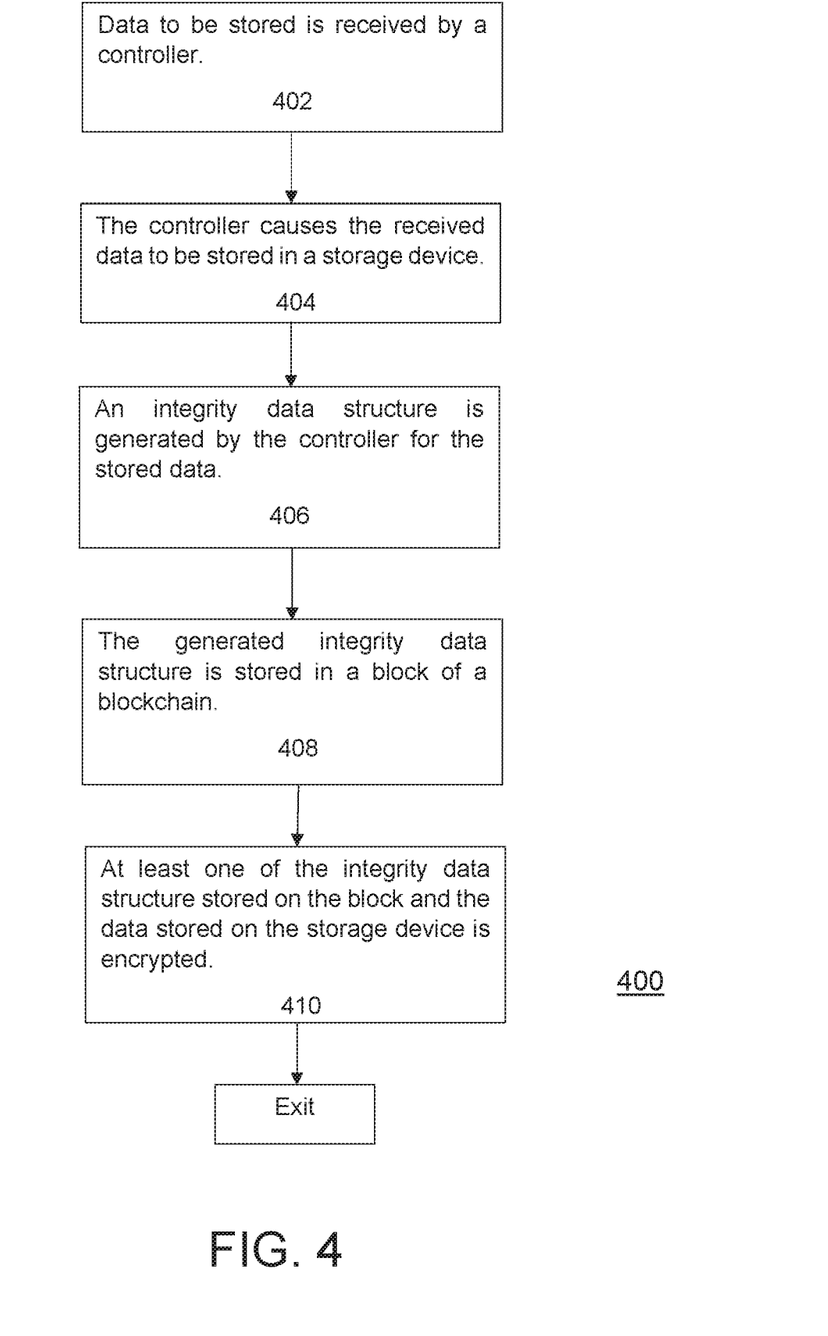
FIG. 4 depicts a flow diagram of a method 400 for securely associatively storing data in a block of a blockchain in accordance with an embodiment of the present principles.

FIG. 4 depicts a flow diagram of a method 400 for securely associatively storing data in a block of a blockchain in accordance with an embodiment of the present principles. The method 400 begins at 402 during which data to be stored is received by a controller in accordance with the present principles. The method 400 can proceed to 404.

At 404, the controller causes the received data to be stored in a storage device. The method 400 can proceed to 406.

At 406, an integrity data structure is generated by the controller for the stored data. As described above, in some embodiments in accordance with the present principles, the integrity data structure includes at least a link identifying a location of where in the storage device the data is stored. Additionally and as further described above, in some embodiments, the integrity data structure can further include a respective integrity check of the stored data. The method 400 can proceed to 408.

At 408, the generated integrity data structure is stored in a block of a blockchain. As described above, once the block is considered complete, the block is added to the blockchain. The method 400 can proceed to 410.

At 410, at least one of the integrity data structure stored on the block and the data stored on the storage device is encrypted. As described above, several encrypting techniques can be applied to perform the encryption including key ratcheting, homomorphic encryption and other known encryption techniques. The method 400 can then be exited.

Figure 5:
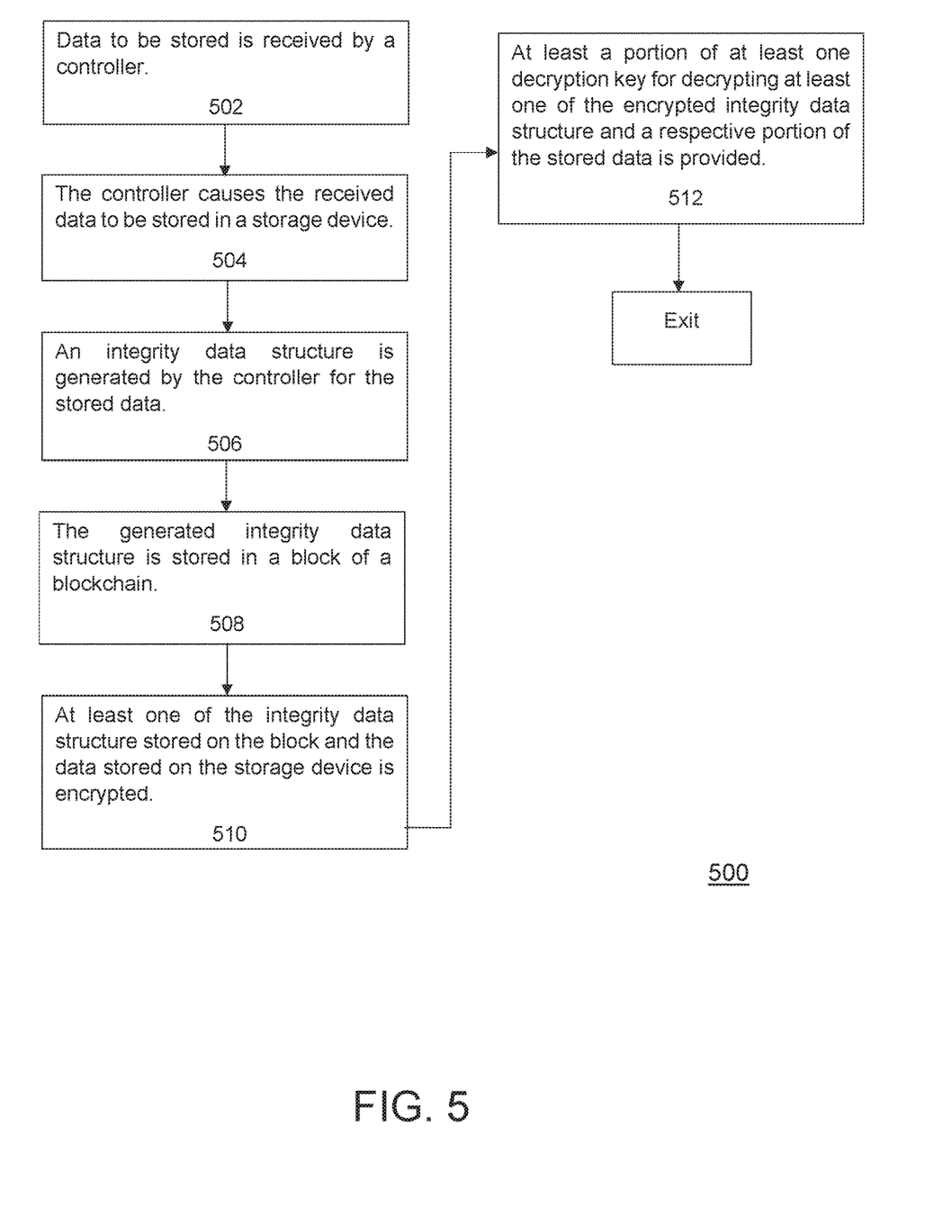
FIG. 5 depicts a flow diagram of a method for providing smart privacy and controlled access to information associatively stored on a block of a blockchain in accordance with an embodiment of the present principles.

FIG. 5 depicts a flow diagram of a method for providing smart privacy and controlled access to information associatively stored on a block of a blockchain in accordance with an embodiment of the present principles. The method 500 begins at 502 during which data to be stored is received by a controller in accordance with the present principles. The method 500 can proceed to 504.

At 504, the controller causes the received data to be stored in a storage device. The method 500 can proceed to 506.

At 506, an integrity data structure is generated by the controller for the stored data. As described above, in some embodiments in accordance with the present principles, the integrity data structure includes an identifier (e.g., a link) identifying a location of where in the storage device the data is stored. Additionally and as further described above, in some embodiments, the integrity data structure can further include a respective integrity check of the stored data. The method 500 can proceed to 508.

At 508, the generated integrity data structure is stored in a block of a blockchain. As described above, once the block is considered complete, the block is added to the blockchain. The method 500 can proceed to 510.

At 510, at least one of the integrity data structure stored on the block and the data stored on the storage device is encrypted. As described above, several encrypting techniques can be applied to perform the encryption including key ratcheting, homomorphic encryption and other known encryption techniques. The method 500 can proceed to 512.

At 512, at least a portion of at least one decryption key for decrypting at least one of the encrypted integrity data structure and a respective portion of the stored data is provided to enable access to the respective portion of the stored data for which the integrity data structure was generated. The method 500 can be exited.

As eluded to above, a distributed computer environment in accordance with the present principles can comprise a Cyber Insurance system. In some embodiments of such a system, a system node can be deployed in a network of each of the participating entities of the Cyber insurance system. The system node deployed at each of the participating entities collects analytics, statistics, and submits data to be stored by, for example the data controller 110. For example, each node could collect firewall logs and analyze the number of port-scans or other connection attempts that were blocked at the perimeter of a participating entities network.

Figure 6:
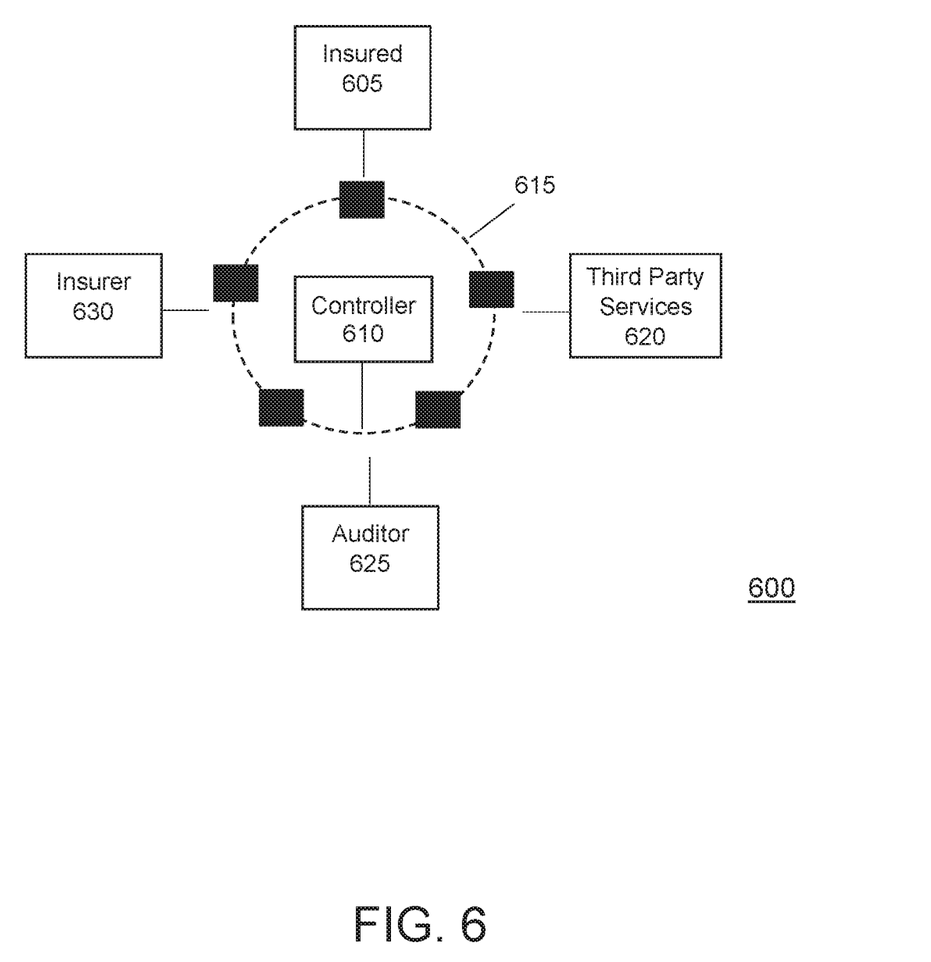
FIG. 6 depicts a high level block diagram of a Cyber Insurance system in accordance with an embodiment of the present principles.

FIG. 6 depicts a high level block diagram of a Cyber Insurance system 600 in accordance with an embodiment of the present principles. The Cyber Insurance system 600 of FIG. 6 illustratively comprises an insured entity 605, an insurer entity 630, a third party services entity 620, an auditor entity 625 and a data controller 610. In the Cyber Insurance system 600 of FIG. 6, all of the entities, including the controller 610, are connected via a permissioned blockchain 615.

In the Cyber Insurance system 600 of FIG. 6, the insured entity 605 can include at least one of a server or node of an entity that requires cyber insurance (e.g., a corporation, a hospital, a university) and the insurer entity 630 can include at least one of a server or a node providing cyber insurance for the insured. In the Cyber Insurance system 600 of FIG. 6, the third party services entity 620 can include at least one of a server or node of entities that can provide very specialized services that can be hard for the insured 605 and insurer 630 to perform and are useful to assess the likelihood of a cyber incident, or the damage resulting from it. One example of such a service could be a service that is analyzing dark web forums and markets, and determine whether the network and systems of the insured are compromised (accounts on them being sold), or identify the latest strains of malware and exploits being sold and what systems and software versions the malware affects, to be able to relate the possibility of such malware existing on a specific insured entity's network/systems. In the Cyber Insurance system 600 of FIG. 6, the auditor entity 625 can include at least one of a server or node of a third party entity needed to investigate and audit the data on the blockchain to, for example, settle a dispute between the insured and the insurer. There can be a need for auditors to be consistently involved in such a distributed system as the Cyber Insurance system 600, and only randomly (or periodically) perform audits to ensure that an insurer's actions and rates are consistent with stored and generated data and events.

As described above in accordance with embodiments of the present principles, the data controller 610 receives data from the participating entities of the Cyber Insurance system 600, either directly from the participating entities or in other embodiments via a distributed blockchain and stores the received data in at least one storage device (not shown). The data controller 610 generates at least one integrity data structure identifying at least a storage location of at least a respective portion of the stored data and stores the generated at least one integrity data structure in a block of the distributed blockchain. As described above, in some embodiments in accordance with the present principles, the integrity data structure can further include an integrity data check of the stored data. As further described above, in some embodiments, the data controller 610 can encrypt at least one of the integrity data structure stored in the block of the blockchain and the data stored in the storage device. Subsequently, when a participating entity requires access to data store in the storage device, the data controller 610 can selectively provide at least a portion of a decryption key for decrypting the encrypted at least one integrity data structure to enable access to the respective portion of the stored data for which an integrity data structure was generated.

A blockchain-based Cyber Insurance system in accordance with the present principles has a natural incentive structure that can encourage entities seeking insurance to participate in the system. For example, assume company C is seeking cyber insurance from insurer R. Further, assume that R has deployed a blockchain-based cyber insurance system in accordance with the present principles. It is in R's interest to assess the possibility of C being the target of a successful cyber incident (e.g., attack or breach) as accurately as possible to reflect such a possibility in the premium and fees that it charges. It is in C's interest to be adequately covered if any incident occurs and also to be paying the minimal premiums and other charges to save money. R can offer C a lower premium if C deploys a node of the present principles on its network as such a node will act as a monitor of the state of the network, and to (continuously) determine whether C is following best practices, and has an associated network and software adequately secured and updated. R will receive (and securely log) this information using a blockchain-based cyber insurance system in accordance with the present principles.

In such systems, competing business interests can require data stored by different parties (and most notably, the enterprise data) to remain private, even in a permissioned blockchain network. In such systems, private channels can be used to provide restricted messaging paths used to exchange data among specific subsets of network members. In some embodiments, all data (including transaction, member and channel information) on a channel is invisible and inaccessible to any network members not explicitly granted access to that channel. In such embodiments, the permissioned network can be constituted of many channels, and each transaction can be executed on a specific channel where each party must be authenticated and authorized to transact on that channel. Such a feature is available for example in the Hyperledger Fabric framework and enables any groups that require private, confidential transactions to coexist on the same permissioned network.

In some embodiments in accordance with the present principles a selective disclosure concept can be implemented. For example, in the cyber insurance use-case, access to raw (unencrypted) data can only be required at certain occurrences (i.e., when an incident occurs, or when the premium has to be recomputed). In that case, the enterprise may only want to provide selective access to data to the insurer. A possibility can therefore be to encrypt, at every time period (e.g., every day) the data with a different secret key, and store an encrypted integrity data structure generated for the data on the blockchain as described above. It then suffices to reveal those keys to the insurer when selective decryption is required. To avoid storage of many encryption keys, as described above, key ratcheting encryption can be used. For example, the key ki=KDF(msk; ti) can be used at each time period _ti, where msk is a long-term secret key, and KDF is a key derivation function. In particular, given ki's for i 2 l, no information is revealed on the kj's with j=2 l.

Other distributed networks that can benefit from a distributed blockchain-based network in accordance with the present principles can include a medical records network, credit rating and reporting networks, medical insurance networks and any other distributed networks in which data needs to be secured and only selectively distributed. Such networks can comprise similar architecture in accordance with embodiments of the present principles as described with respect to the distributed networks systems of FIG. 1 and FIG. 6.

While the foregoing is directed to embodiments of the present principles, other and further embodiments may be devised without departing from the basic scope thereof. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

In the foregoing description, numerous specific details, examples, and scenarios are set forth in order to provide a more thorough understanding of the present principles. It will be appreciated, however, that embodiments of the principles can be practiced without such specific details. Further, such examples and scenarios are provided for illustration, and are not intended to limit the teachings in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation of the data controller 110, 610.

The invention claimed is:

1. A method for providing controlled access to data in a distributed computing environment using at least one permissioned blockchain that is maintained by a plurality of servers, comprising:

receiving, from a server of the plurality of servers, data that is generated by at least one of the plurality of servers and associating different portions of the received data with at least one respective block of the at least one permissioned blockchain;

permanently storing the received data in at least one storage device, wherein the at least one storage device is external to the plurality of servers;

for each of the respective at least one block of the at least one permissioned blockchain with which different portions of the data are associated, generating at least one respective integrity data structure including an identifier identifying at least a respective location in the at least one storage device where the portion of the data associated with the respective at least one block of the at least one permissioned blockchain is permanently stored and including a respective hash value representation of the portion of the data associated with the respective at least one block of the at least one permissioned blockchain, which is referenced in the identifier of the generated at least one respective integrity data structure;

for each of the respective at least one block of the at least one permissioned blockchain with which different portions of the data are associated, storing in at least one block of the respective at least one block the generated at least one respective integrity data structure, which includes the respective identifier and the respective hash value representation of the portion of the data associated with the respective at least one block of the at least one permissioned blockchain;

encrypting the at least one integrity data structure, which includes the respective identifier and the respective hash value representation; and selectively providing at least a portion of at least one decryption key for decrypting the encrypted at least one integrity data structure to enable access to a respective portion of the permanently stored data for which the at least one integrity data structure is generated.

2. The method of claim 1, wherein the received data is stored in a single, external storage device.

3. The method of claim 1, wherein each of the at least one integrity data structures comprises a link to a respective portion of the data stored in the at least one storage device.

4. The method of claim 1, wherein each of the at least one integrity data structures comprises at least one of an address of a respective portion of the data stored in the at least one storage device and an integrity check data representation of a respective portion of the stored data for which the at least one integrity data structure is provided.

5. The method of claim 1, wherein each of the at least one integrity data structures is encrypted using at least one of a key ratcheting encryption technique or a homomorphic encryption technique.

6. The method of claim 1, wherein the encrypting comprises a multiparty computation technique.

7. The method of claim 1, comprising encrypting the stored data.

8. The method of claim 7, comprising selectively providing at least a portion of at least one decryption key for decrypting the stored data.

9. The method of claim 1, comprising:

generating at least one respective integrity data structure for each block of the at least one blockchain, each of the at least one respective integrity data structure including an identifier identifying at least a location in the at least one storage device where data associated with each respective block of the at least one blockchain is stored and including a respective hash value representation of the data to be stored in each of the blocks of the at least one blockchain; and storing the generated, respective at least one integrity data structure in the respective block of the at least one blockchain.

10. The method of claim 1, wherein at least one of the storing of the received data, the generating at least one integrity data structure, or the storing the generated at least one integrity data structure is performed using a data controller.

11. The method of claim 1, wherein the at least one blockchain comprises a permissioned blockchain which includes private channels to provide restricted messaging paths used to exchange data among specific subsets of members of the distributed computing environment.

12. An apparatus for providing controlled access to data in a distributed computing environment using at least one permissioned blockchain that is maintained by a plurality of servers, comprising:

a processor; and a memory coupled to the processor, the memory having stored therein at least one of programs or instructions executable by the processor to configure the apparatus to:

receive, from a server of the plurality of servers, data that is generated by at least one of the plurality of servers and associate different portions of the received data with at least one respective block of the at least one permissioned blockchain;

permanently store the received data in at least one storage device, wherein the at least one storage device is external to the plurality of servers;

for each of the respective at least one block of the at least one permissioned blockchain with which different portions of the data are associated, generate at least one respective integrity data structure including an identifier identifying at least a respective location in the at least one storage device where the portion of the data associated with the respective at least one block of the at least one permissioned blockchain is permanently stored and including a respective hash value representation of the portion of the data associated with the respective at least one block of the at least one permissioned blockchain, which is referenced in the identifier of the generated at least one respective integrity data structure;

for each of the respective at least one block of the at least one permissioned blockchain with which different portions of the data are associated, store in at least one block of the respective at least one block the generated at least one respective integrity data structure, which includes the respective identifier and the respective hash value representation of the portion of the data associated with the respective at least one block of the at least one permissioned blockchain;

encrypt the at least one integrity data structure, which includes the respective identifier and the respective hash value representation; and selectively provide at least a portion of at least one decryption key for decrypting the encrypted at least one integrity data structure to enable access to a respective portion of the permanently stored data for which the at least one integrity data structure is generated.

13. The apparatus of claim 12, wherein each of the at least one integrity data structures comprises an integrity check data representation of a respective portion of the stored data for which the at least one integrity data structure is provided.

14. The apparatus of claim 12, wherein the apparatus is further configured to encrypt the stored data.

15. The apparatus of claim 12, wherein the apparatus is further configured to selectively provide at least a portion of at least one decryption key for decrypting the stored data.

16. The apparatus of claim 12, wherein the processor configures the apparatus to:

generate at least one respective integrity data structure for each block of the at least one blockchain, each of the at least one respective integrity data structure including an identifier identifying at least a location in the at least one storage device where data associated with each respective block of the at least one blockchain is stored and including a respective hash value representation of the data to be stored in each of the blocks of the at least one blockchain; and store the generated, respective at least one integrity data structure in the respective block of the at least one blockchain.

17. The apparatus of claim 12, wherein the at least one blockchain comprises a permissioned blockchain which includes private channels to provide restricted messaging paths used to exchange data among specific subsets of members of the distributed computing environment.

18. A system for providing controlled access to data in a distributed computing environment, comprising:

a plurality of servers connected via at least one permissioned blockchain;

at least one storage device external to the plurality of servers participating in the at least one permissioned blockchain; and an apparatus comprising a processor and a memory coupled to the processor, the memory having stored therein at least one of programs or instructions executable by the processor to configure the apparatus to:

receive, from a server of the plurality of servers, data that is generated by at least one of the plurality of servers and associate different portions of the received data with at least one respective block of the at least one permissioned blockchain;

permanently store the received data in the at least one storage device;

for each of the respective at least one block of the at least one permissioned blockchain with which different portions of the data are associated, generate at least one respective integrity data structure including an identifier identifying at least a respective location in the at least one storage device where the portion of the data associated with the respective at least one block of the at least one permissioned blockchain is permanently stored and including a respective hash value representation of the portion of the data associated with the respective at least one block of the at least one permissioned blockchain, which is referenced in the identifier of the generated at least one respective integrity data structure;

for each of the respective at least one block of the at least one permissioned blockchain with which different portions of the data are associated, store in at least one block of the respective at least one block the generated at least one respective integrity data structure, which includes the respective identifier and the respective hash value representation of the portion of the data associated with the respective at least one block of the at least one permissioned blockchain;

encrypt the at least one integrity data structure, which includes the respective identifier and the respective hash value representation; and selectively provide at least a portion of at least one decryption key for decrypting the encrypted at least one integrity data structure to enable access to a respective portion of the permanently stored data for which the at least one integrity data structure is generated.

19. The system of claim 18, wherein the storage device comprises a cloud server.

20. The system of claim 18, wherein the distributed computing environment comprises a cyber insurance network.

21. The system of claim 18, wherein the apparatus is further configured to encrypt the stored data and wherein the apparatus is further configured to selectively provide at least a portion of at least one decryption key for decrypting the stored data.

22. The system of claim 18, wherein at least one of the storing of the received data, the generating at least one integrity data structure, or the storing the generated at least one integrity data structure is performed using a data controller.

* * * * *